United States Patent [19]

Meuschke et al.

[11] 4,170,517

[45] Oct. 9, 1979

[54] PERMANENT SEAL RING FOR A NUCLEAR REACTOR CAVITY

[75] Inventors: Robert E. Meuschke, Pittsburgh, Pa.; Walter E. Desmarchais, Corona del Mar, Calif.; Leonard R. Katz, Pittsburgh, Pa.

[73] Assignee: Westinghouse Electric Corp., Pittsburgh, Pa.

[21] Appl. No.: 502,315

[22] Filed: Sep. 3, 1974

[51] Int. Cl.² ............................................. G21C 19/20
[52] U.S. Cl. .......................................... 176/87; 176/30
[58] Field of Search ..................... 176/37, 38, 87, 30, 176/31, 32; 220/3, 378

[56] References Cited

U.S. PATENT DOCUMENTS

| | | | |
|---|---|---|---|
| 2,153,580 | 4/1939 | Lynger | 220/378 |
| 2,453,124 | 11/1948 | Fletcher et al. | 220/378 |
| 2,641,381 | 6/1953 | Bertrand | 220/378 |
| 2,805,789 | 9/1957 | Kreh et al. | 176/87 |
| 2,821,325 | 1/1958 | Chapellier et al. | 176/87 |
| 2,949,320 | 8/1960 | Low et al. | 220/378 |
| 3,568,379 | 3/1971 | Johnsson et al. | 220/3 |
| 3,578,564 | 5/1971 | Fletcher | 176/87 |
| 3,633,784 | 1/1972 | Taft | 176/87 |
| 3,753,853 | 8/1973 | Schabert | 176/87 |
| 3,812,008 | 5/1974 | Fryer | 176/87 |

Primary Examiner—Samuel W. Engle
Assistant Examiner—S. A. Cangialosi
Attorney, Agent, or Firm—D. C. Abeles; Z. L. Dermer

[57] ABSTRACT

A nuclear reactor containment arrangement incorporating a permanent cavity to vessel seal in the form of a flexible quarter-circular annular steel gasket affixed to and extending between the reactor vessel seal plate and cavity wall. The seal functions to isolate the periphery of the vessel from a permanent water-tight compartment above the reactor vessel which is flooded during refueling operations to minimize the release of radiation upon exposure of the nuclear core. The seal is designed to accommodate both radial and axial expansion of the pressure vessel relative to the cavity wall occurring during reactor operation without breaking the water-tight integrity of the seal. The pressure vessel ventilation system is provided with an air exit duct at the reactor nozzle level to facilitate the circulation of air around the periphery of the vessel which would otherwise be restricted at the seal to vessel interface.

6 Claims, 2 Drawing Figures

PERMANENT SEAL RING FOR A NUCLEAR REACTOR CAVITY

BACKGROUND OF THE INVENTION

This invention generally pertains to reactor vessel enclosures and more particularly to reactor vessel cavity structures including a refueling canal.

Refueling of pressurized water reactors is an established routine operation carried out with a high degree of reliability. For normal load requirements, refueling is provided on approximately yearly intervals. The complete refueling operation normally takes approximately four weeks.

In a number of nuclear containment arrangements the reactor vessel is positioned within a concrete cavity having an upper annular portion above the vessel which defines the refueling canal. The canal is maintained dry during reactor operations, however, during refueling of a nuclear power plant, the canal is filled with water. The water level is high enough to provide adequate shielding in order to maintain the radiation levels within acceptable limits when the fuel assemblies are removed completely from the vessel. Boric acid is added to the water to insure sub-critical conditions during refueling. The reactor vessel flange is sealed to the lower portion of the canal by a clamped gasket seal ring which prevents leakage of refueling water to the well in which the vessel is seated. This gasket is fastened and sealed after reactor cool down prior to flooding of the canal. Presently, the removable seal ring comprises four large diameter elastomer gaskets which are susceptible to leakage and must be replaced at each refueling operation.

A new concept has been developed by one reactor vendor for refueling pressurized water reactors in less than seven days. The advantages of rapid refueling are associated with a half yearly refueling cycle. This combination of rapid refueling and half yearly refueling, results in savings in fuel costs and increased availability of the nuclear steam supply system.

Rapid refueling reduces the number of operator actions in the refueling operation by eliminating certain operations and minimizing the number of components to be handled as explained in U.S. Pat. No. 3,752,737, issued Aug. 14, 1973 to E. Frisch et al and related patents cross-referenced therein. In fact, the number of individual handling operations are reduced by a factor of about six. Whereas current plants require approximately 2,500 handling operations, the rapid refueling system requires only 425. This has been achieved through design innovations which no longer require electrical lines to be disconnected in the operation, provide a quick opening reactor vessel closure, minimize fuel handling operations, expose the core in a single lift, and park the control rods in the head and upper internals.

While the above design innovations have simplified refueling operations considerably, the reactor vessel flange seal structure still provides a source of delay in establishing the base conditions for exposing the reactor core for refueling.

Accordingly, a new reactor cavity to seal arrangement is desired capable of expediting refueling operations.

SUMMARY OF THE INVENTION

Briefly, this invention provides an improved nuclear reactor containment arrangement incorporating a permanent water-tight flexible seal affixed to and extending between the peripheral wall of the reactor pressure vessel proximate the vessel opening and the structural wall surrounding the reactor cavity. This seal is designed to accommodate radial and axial expansion of the pressure vessel relative to the cavity wall experienced during reactor operation without breaking the water-tight integrity of the seal. The water-tight barrier formed by the seal functions to isolate the peripheral walls of the pressure vessel from a permanent water-tight compartment above the vessel opening which is flooded during refueling operations to minimize the release of radiation upon exposure of the core. In one embodiment, air circulating around the periphery of the vessel is enhanced by an air conduit arrangement through the cavity wall concurrent with at least one of the vessel nozzles.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

This invention provides a new reactor vessel to cavity seal arrangement that forms a permanent flexible seal between the reactor vessel and the reactor cavity floor effecting a water-tight seal for the refueling canal during refueling operations while accommodating material expansions and contractions that occur during normal reactor operations, without destroying the water-tight integrity of the seal.

Figure 1:
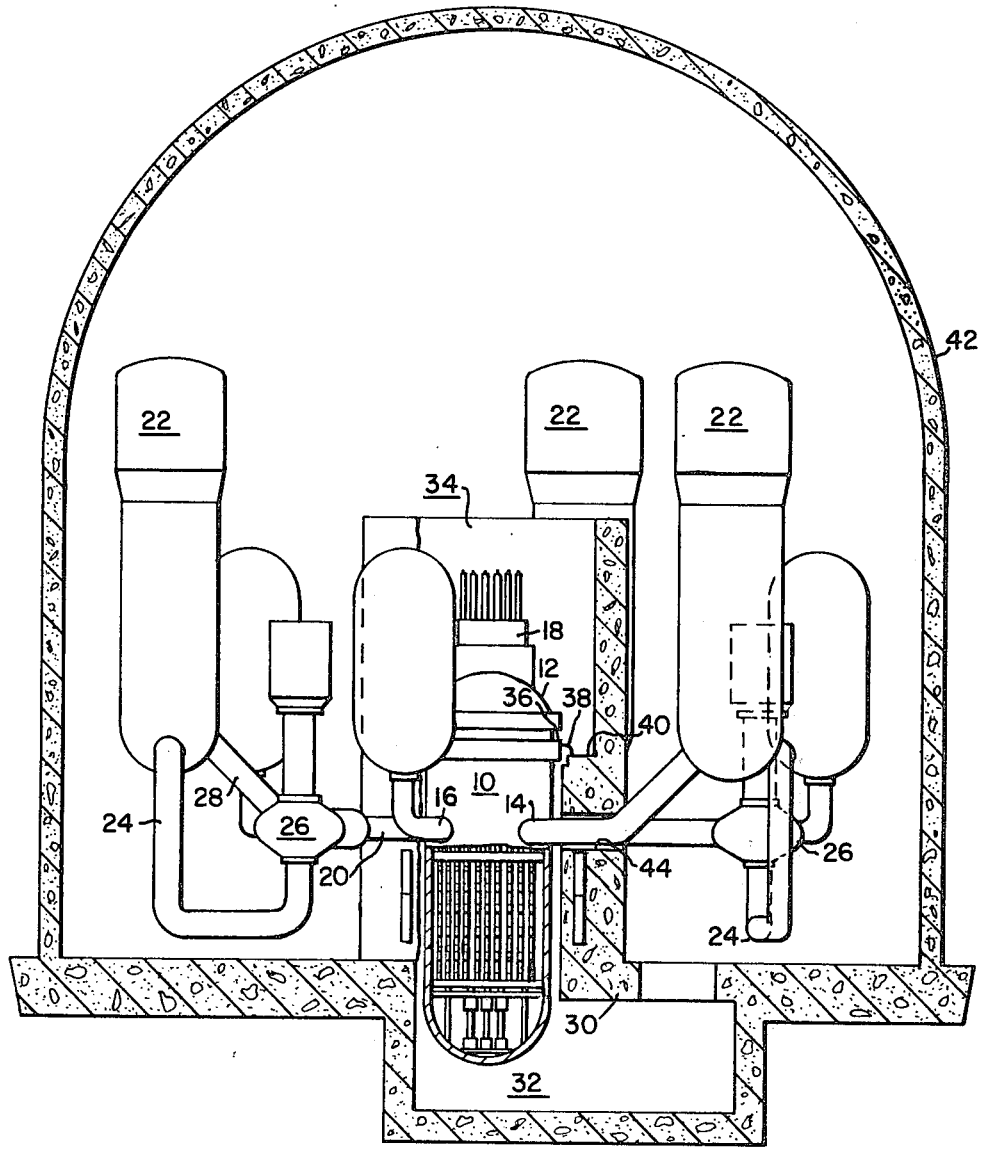
FIG. 1 is a plan view of a reactor containment incorporating this invention.

The invention can best be understood by reference to the plan view of a reactor containment illustrated in FIG. 1 which shows a nuclear steam generating system of the pressurized water type incorporating the permanent water tight seal ring of this invention. A pressurized vessel 10 is shown which forms a pressurized container when sealed by its head assembly 12. The vessel has coolant flow inlet means 14 and coolant flow outlet means 16 formed integral with and through its cylindrical walls. As is known in the art, the vessel 10 contains a nuclear core (not shown) consisting mainly of a plurality of clad nuclear fuel elements which generate substantial amounts of heat depending primarily upon the position of control means, the pressure vessel housing 18 of which is shown. The heat generated by the reactor core is conveyed from the core by coolant flow entering through inlet means 14 and exiting through outlet means 16.

The flow exiting through outlet means 16 is conveyed through hot leg conduit 20 to a heat exchange steam generator 22. The steam generator 22 is of the type wherein heated coolant flow is conveyed through tubes (not shown) which are in heat exchange relationship with water which is utilized to produce steam. The steam produced by the steam generator 22 is commonly utilized to drive a turbine (not shown) for the production of electricity. The flow is conveyed from the steam generator 22 through conduit 24 to a pump 26 from which it proceeds through cooled leg conduit 28 to inlet means 14. Thus, it can be seen that a closed recycling primary or steam generating loop is provided with coolant piping communicably coupling the vessel 10, the steam generator 22, and the pump 26. The generating system illustrated in FIG. 1 has three such closed fluid flow systems or loops. The number of such systems should be understood to vary from plant to plant, but commonly two, three or four are employed.

Within the containment 42 the reactor vessel 10 and head enclosure 12 are maintained within a separate reactor cavity surrounded by a concrete wall 30. The reactor cavity is divided into a lower portion 32 which completely surrounds the vessel structure itself and an upper portion 34 which is commonly utilized as a refueling canal. In prior art designs, air flow communication was maintained between the lower reactor vessel well 32 and the refueling canal 34 to assist cooling of the concrete walls of the reactor cavity and the excore detectors embedded within the concrete walls. The air flow was facilitated by exhaust fans positioned within the containment 40 outside of the concrete barrier 30. During refueling operations, the reactor vessel flange 36 was sealed to the reactor cavity shelf 40 by a clamped gasket seal ring which prevented leakage of refueling water to the cavity space directly below the reactor vessel. Such seals, however, required considerable time be allotted for their installation and could not be fastened into place until the reactor cooled down. Furthermore, installation of the seal cut off the air path which facilitated circulation of the cooling medium around the lower portion of the vessel cavity.

This invention expedites refueling procedures by providing a permanent reactor vessel to cavity seal 38 between the reactor vessel flange 36 and the cavity shelf 40 which accommodates the normal material expansions and contractions experienced during reactor operation while maintaining the water-tight integrity of the seal essential during refueling operations. In addition, a structural modification to the cavity wall around the nozzle locations 14 and 16 facilitates air flow in the lower portion of the reactor cavity, which enables cooling to occur during refueling operations as well as during reactor operations. Continuous air cooling is accomplished through the designed enlarged apertures 44 surrounding the coolant piping exiting through the cavity walls 30.

Figure 2:
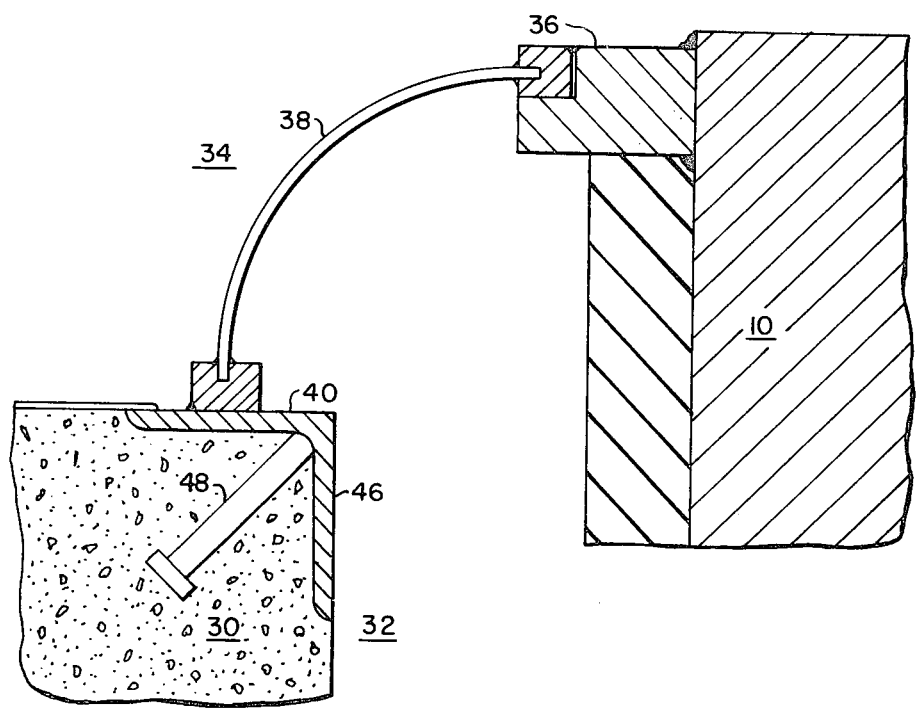
FIG. 2 is an enlarged cross-sectional view of the reactor vessel cavity seal illustrated in FIG. 1.

The seal ring of this invention can better be appreciated by reference to FIG. 2 which shows a cross-section of the seal and its interface with the reactor cavity shelf and the reactor vessel flange. In its preferred form, the seal is constructed as a 0.25 inch thick stainless steel annular ring having a quarter-circle cross-section with an approximate eight inch radius. At one end the seal 38 is welded to the reactor vessel flange 36 and at the other end to an angle 46, covering an edge of the reactor shelf 40, which is secured by an anchor 48 embedded in the concrete of the cavity wall 30. Thus, the permanent seal 38 maintains the water-tight integrity of the refueling canal 34 and isolates the portion of the reactor vessel well 32 encompassing the vessel 10.

The particular design of this invention has been shown to exhibit the flexibility and durability of accommodating over 400 cycles of expansion and contraction, far exceeding the number required to satisfy normal reactor operations and refueling requirements throughout reactor life.

Thus, the containment arrangement of this invention expedites refueling operations by removing the present necessity of testing and/or replacing seal O-rings at refueling and the sealing and raising of seal plates, thus increasing the efficiency of reactor operations. Furthermore, the vessel well cooling system can be continuously operated to assure that the excore detectors and concrete cavity walls are continuously maintained below their specified temperature limits, thereby assuring the continued reliability of the containment equipment.

We claim as our invention:

1. A nuclear reactor containment arrangement including:
    an open ended pressure vessel operable to expand and contract during cyclic operation of the reactor;
    a structural wall spaced from and surrounding the peripheral wall of the pressure vessel defining an open annulus therebetween; and
    a water tight flexible annular ring seal having a quarter-circular cross section permanently affixed to and extending between the peripheral wall of the vessel proximate the vessel opening and the structural wall, the seal being constructed to cyclicly contract and expand respectively with cyclic expansion and contraction of the vessel relative to the wall during reactor operation while maintaining the water-tight integrity of the seal.

2. The nuclear reactor containment arrangement of claim 1 wherein the quarter-circular arc of the annular ring is positioned to have a convex interface with the open annulus.

3. The nuclear reactor containment arrangement of claim 1 wherein the quarter-circular arc of the annular ring is formed with an eight inch radius.

4. The nuclear reactor containment arrangement of claim 1 wherein the seal has a quarter inch thickness.

5. The nuclear reactor containment arrangement of claim 1 wherein the wall of the pressure vessel adjacent the open end has an outwardly extending flange adapted to receive a head enclosure and wherein one end of the arc of the quarter-circular seal ring is permanently affixed and sealed to the outwardly extending end of the flange and the other end of the arc is affixed and sealed to the structural wall.

6. The nuclear reactor containment arrangement of claim 1 wherein the seal is constructed from stainless steel.

* * * * *